US011385254B2

(12) United States Patent
Ebihara et al.

(10) Patent No.: US 11,385,254 B2
(45) Date of Patent: Jul. 12, 2022

(54) MOVEMENT DISTANCE CALCULATION DEVICE

(71) Applicant: DENSO TEN Limited, Kobe (JP)

(72) Inventors: Hiroshi Ebihara, Kobe (JP); Tetsuo Yamamoto, Kobe (JP); Hiroki Morinaga, Kobe (JP)

(73) Assignee: DENSO TEN Limited, Kobe (JP)

(*) Notice: Subject to any disclaimer, the term of this patent is extended or adjusted under 35 U.S.C. 154(b) by 457 days.

(21) Appl. No.: 16/693,838

(22) Filed: Nov. 25, 2019

(65) Prior Publication Data

US 2020/0233005 A1 Jul. 23, 2020

(30) Foreign Application Priority Data

Jan. 18, 2019 (JP) .............................. JP2019-007017

(51) Int. Cl.
*G06K 9/00* (2022.01)
*G01P 3/38* (2006.01)
(Continued)

(52) U.S. Cl.
CPC ................ *G01P 3/38* (2013.01); *G01C 22/00* (2013.01); *G01P 7/00* (2013.01); *G06T 7/74* (2017.01); *G06T 2207/30252* (2013.01)

(58) Field of Classification Search
CPC .......... G06T 2207/30261; G06T 7/269; G06T 2207/10016; G06T 2207/30252; G06T 2207/10028; G06T 7/215; G06T 7/246; G06T 2207/10004; G06T 2207/20081; G06T 2207/30244; G06T 2207/30256; G06T 7/20; G06T 7/70; G08G 1/166; G08G 1/165; G08G 1/167; G08G 1/168; G08G 5/0043; G06V 20/58; G06V 20/56;
(Continued)

(56) References Cited

U.S. PATENT DOCUMENTS

2003/0210807 A1* 11/2003 Sato ...................... G08G 1/165
382/104
2014/0037138 A1* 2/2014 Sato ...................... G06V 20/58
382/103
2015/0379354 A1* 12/2015 Zhou ....................... G06T 7/246
382/103

FOREIGN PATENT DOCUMENTS

JP 2011-008385 A 1/2011
JP 2018-009833 A 1/2018
WO 2013/051645 A1 4/2013

* cited by examiner

*Primary Examiner* — Alex Kok S Liew
(74) *Attorney, Agent, or Firm* — Oliff PLC

(57) ABSTRACT

A movement distance calculation device includes: a first movement distance calculation unit which calculates a first movement distance of a movable body based on plural rotation speeds of plural wheels of the movable body and a steering angle of the movable body; a vector detection unit which detects a movement vector of an object included in the acquired images as defined herein; a second movement distance calculation unit which calculates a second movement distance of the movable body based on the movement vector; a first reliability determining unit which determines reliability of the calculated first movement distance as defined herein; a second reliability determining unit which determines reliability of the calculated second movement distance as defined herein; and a movement distance determining unit which determines a movement distance using at least one of the calculated first movement distance and the calculated second movement distance as defined herein.

20 Claims, 10 Drawing Sheets

(51) Int. Cl.
*G01P 7/00* (2006.01)
*G06T 7/73* (2017.01)
*G01C 22/00* (2006.01)

(58) Field of Classification Search
CPC ... B60R 1/00; B60R 21/203; B60R 2300/305; B60R 2300/307; B60R 2300/8033; B60R 2300/806; B60R 2300/8086
See application file for complete search history.

FIG. 9

DETERMIONATION TABLE 28

|  | (FIRST RELIABILITY 21b) ≥ TH1 | (FIRST RELIABILITY 21b) < TH1 |
|---|---|---|
| (SECOND RELIABILITY 23b) ≥ TH2 | FIRST MOVEMENT DISTANCE 21a | SECOND MOVEMENT DISTANCE 23a |
| (SECOND RELIABILITY 23b) < TH2 | FIRST MOVEMENT DISTANCE 21a | FIRST MOVEMENT DISTANCE 21a |

MOVEMENT DISTANCE CALCULATION DEVICE

CROSS-REFERENCE TO RELATED APPLICATIONS

This application is based on and claims priority under 35 USC 119 from Japanese Patent Application No. 2019-7017 filed on Jan. 18, 2019.

TECHNICAL FIELD

The present invention relates to a movement distance calculation device for calculating a movement distance of a movable body.

BACKGROUND ART

It is now a common practice for movable bodies such as vehicles to use GPS (global positioning system) information to determine its current position. However, vehicles cannot acquire GPS information while running through a tunnel, for example. In this case, the accuracy of positions determined on the basis of GPS information lowers.

JP-A-2018-9833 discloses a running assist device that determines a position of a vehicle using a camera using an image taken by a camera that is installed in the vehicle.

In JP-A-2018-9833, the running assist device calculates a first movement distance of a vehicle on the basis of an image taken by a camera installed in the vehicle. When the error of GPS information is large, the running assist device determines reliability of the first movement distance.

If the determined reliability is higher than or equal to a prescribed threshold value, the running assist device determines a current position on the basis of a position indicated by the GPS information and the calculated first movement distance. If the determined reliability is lower than the prescribed threshold value, the running assist device corrects the calculated first movement distance on the basis of a vehicle speed and a measurement value of a yaw sensor and determines a current position on the basis of the position indicated by the GPS information and the calculated first movement distance.

A movement distance of a vehicle can be calculated on the basis of a vehicle speed and a measurement value of the yaw sensor. A second movement distance is defined as a movement distance calculated on the basis of a vehicle speed and a measurement value of the yaw sensor. There may occur a case that the second movement distance is higher in accuracy than the first movement distance which is calculated using an image taken. However, in JP-A-2018-9833, no consideration is given to the accuracy of the second movement distance. This raises a problem that there exists a limit in increase of the accuracy of a vehicle movement distance that is used in determining a current position of the vehicle.

SUMMARY OF INVENTION

In view of the above problem, an object of the present invention is to provide a movement distance calculation device capable of increasing the accuracy of a calculated movement distance of a movable body.

A first aspect of the invention provides a movement distance calculation device comprising a first movement distance calculation unit, a vector detection unit, a second movement distance calculation unit, a first reliability determining unit, a second reliability determining unit, and a movement distance determining unit. The first movement distance calculation unit calculates a first movement distance of a movable body on the basis of plural rotation speeds of plural wheels of the movable body and a steering angle of the movable body. The vector detection unit acquires, at a prescribed time interval, images taken by a camera installed in the movable body and detects a movement vector of an object included in the acquired images. The second movement distance calculation unit calculates a second movement distance of the movable body on the basis of the movement vector detected by the vector detection unit. The first reliability determining unit determines reliability of the calculated first movement distance on the basis of at least one of a variation of the plural rotation speeds and a result of comparison between the first movement distance calculated by the first movement distance calculation unit and the second movement distance calculated by the second movement distance calculation unit. The second reliability determining unit determines reliability of the calculated second movement distance on the basis of information relating to an object included in the acquired images. The movement distance determining unit determines a movement distance using at least one of the calculated first movement distance and the calculated second movement distance on the basis of the reliability of the first movement distance determined by the first reliability determining unit and the reliability of the second movement distance determined by the second reliability determining unit.

In the first aspect of the invention, the movement distance determining unit determines a movement distance of the movable body on the basis of the reliability of the first movement distance determined on the basis of the rotation speeds of the wheels and the steering angle of the movable body and the reliability of the second movement distance determined on the basis of the image taken. The first aspect of the invention can increase the accuracy of a movement distance of the movable body by using the reliability of each of the first movement distance and the second movement distance.

According to a second aspect of the invention which is based on the first aspect of the invention, if the reliability of the first movement distance determined by the first reliability determining unit is higher than a first threshold value, the movement distance determining unit selects the determined first movement distance irrespective of the reliability of the second movement distance determined by the second reliability determining unit.

The second aspect of the invention relates to a case that the error of the first movement distance is smaller than that of the second movement distance. When the reliability of the first movement distance is higher than that of the second movement distance, the accuracy of a movement distance can be increased further by the movement distance determining unit's selecting the first movement distance irrespective of the reliability of the second movement distance.

According to a third aspect of the invention which is based on the first or second aspect of the invention, when the movable body is performing a crawl control, the first reliability determining unit sets the reliability of the first movement distance lower than when the movable body is not performing the crawl control.

In the third aspect of the invention, the movable body is running performing the crawl control, the rotation speeds of the respective wheels are controlled individually. Since it is expected that this will lower the accuracy of the first movement distance, the first reliability determining unit lower the reliability of the first movement distance. Reduction of the accuracy of a movement distance can be suppressed because the degree of reflection of the first movement distance in the movement distance of the movable body lowers.

According to a fourth aspect of the invention which is based on the any one of the first to third aspects of the invention, the plural wheels include a first wheel and a second wheel disposed at a rear position of the movable body. When the movable body is performing a turn assist control during a turn of the movable body, the first reliability determining unit sets the reliability of the first movement distance lower than when that the movable body is not performing the turn assist control.

In the fourth aspect of the invention, when the movable body is performing the turn assist control, the rotation speeds of the rear wheels of the movable body are controlled individually. Since it is expected that this will lower the accuracy of the first movement distance, the first reliability determining unit lowers the reliability of the first movement distance. Reduction of the accuracy of a movement distance can be suppressed because the degree of reflection of the first movement distance in the movement distance of the movable body lowers.

According to a fifth aspect of the invention which is based on any one of the first to fourth aspects of the invention, when the movable body is slipping, the first reliability determining unit sets the reliability of the first movement distance lower than when the movable body is not slipping.

In the fifth aspect of the invention, the accuracy of the first movement distance which is determined on the basis of the rotation speeds lowers to a large extent when the movable body is slipping. Thus, the first reliability determining unit lowers the reliability of the first movement distance when the movable body is slipping. As a result, reduction of the accuracy of a movement distance can be suppressed.

According to a sixth aspect of the invention which is based on any one of the first to fifth aspects of the invention, where idle rotation is occurring in the movable body, the first reliability determining unit sets the reliability of the first movement distance lower than when idle rotation is not occurring in the movable body.

In the sixth aspect of the invention, the accuracy of the first movement distance which is determined on the basis of the rotation speeds lowers to a large extent when idle rotation is occurring. Thus, the first reliability determining unit lowers the reliability of the first movement distance when idle rotation is occurring. As a result, reduction of the accuracy of a movement distance can be suppressed.

According to a seventh aspect of the invention which is based on any one of the first to fourth aspects of the invention, where the second reliability determining unit determines reliability of the calculated second movement distance on the basis of at least one of the number of feature points and a variation of a distribution of the feature points.

The seventh aspect of the invention can increase the accuracy of a movement distance further by determining reliability of the second movement distance on the basis of the magnitude or a variation of the movement vector.

An eighth aspect of the invention provides a movement distance calculation method comprising steps (a) to (g). Step (a) calculates a first movement distance of a movable body on the basis of plural rotation speeds of plural wheels of the movable body and a steering angle of the movable body. Step (a) acquires, at a prescribed time interval, images taken by a camera installed in the movable body and detects a movement vector of an object included in the acquired images. Step (c) calculates a second movement distance of the movable body on the basis of information relating to an object included in the acquired images. Step (d) determines reliability of the calculated first movement distance on the basis of at least one of a variation of the plural rotation speeds and a result of comparison between the calculated first movement distance and the calculated second movement distance. Step (e) determines reliability of the calculated second movement distance on the basis of information relating to an object included in the acquired images. Step (f) determines a movement distance using at least one of the calculated first movement distance and the calculated second movement distance on the basis of the determined reliability of the first movement distance and the determined reliability of the second movement distance.

The eighth aspect of the invention is employed in the first aspect of the invention.

The invention can provide a movement distance calculation device capable of increasing the accuracy of a calculated movement distance of a movable body.

BRIEF DESCRIPTION OF DRAWINGS

FIG. 9 shows an example determination table that is used by a movement distance determining unit shown in FIG. 3.

DETAILED DESCRIPTION OF THE INVENTION

Figure 1:
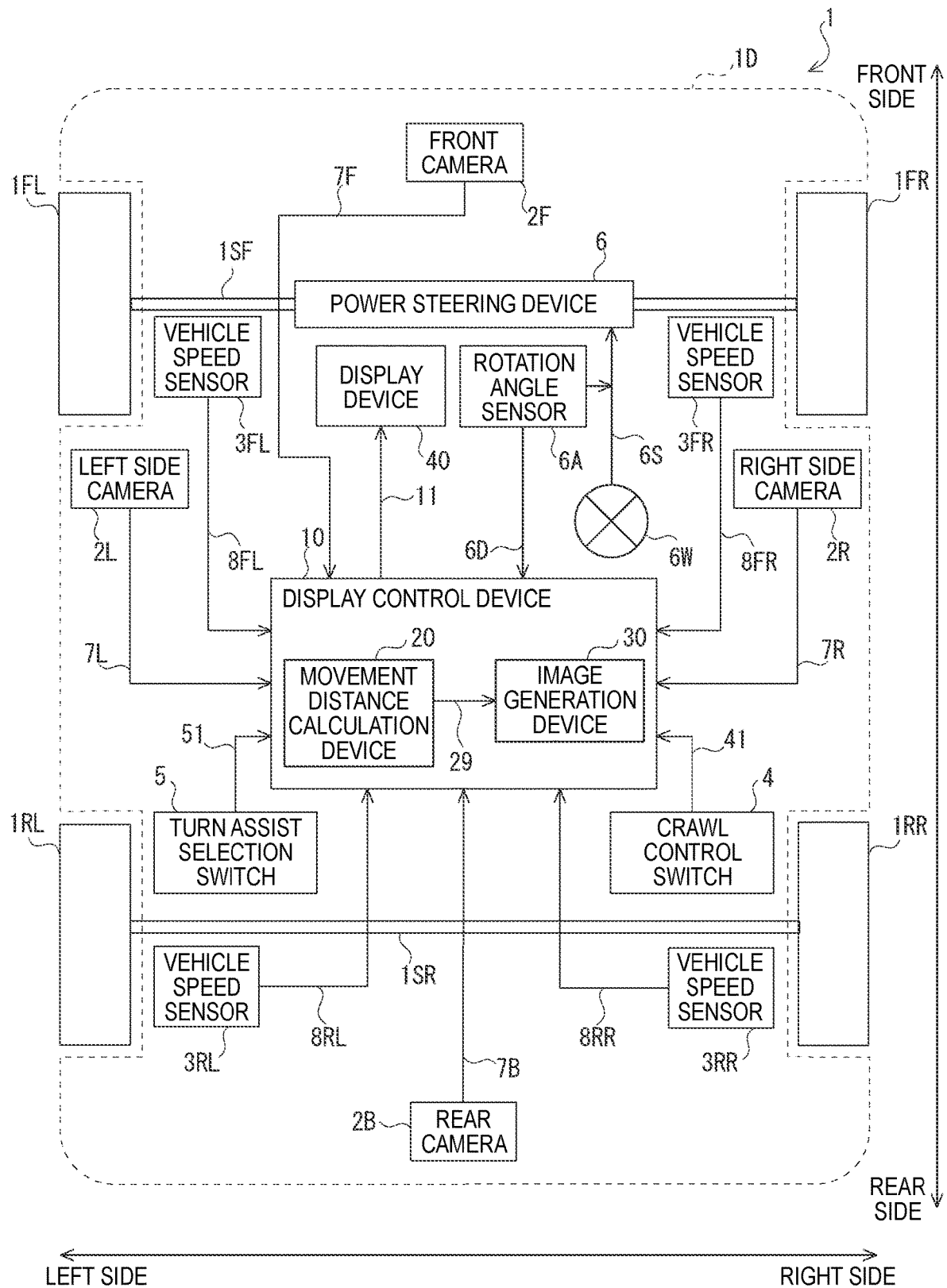
FIG. 1 is a functional block diagram showing the configuration of a vehicle in which a movement distance calculation device according to an embodiment of the present invention is installed.

An embodiment of the present invention will be hereinafter described with reference to the drawings. The same or equivalent devices, units etc. in the drawings will be given the same reference symbols and will not be described redundantly.

[1. Configuration]
[1.1. Configuration of Vehicle 1]

FIG. 1 is a functional block diagram showing the configuration of a vehicle 1 in which a movement distance calculation device 20 according to the embodiment of the invention is installed. As shown in FIG. 1, the movement distance calculation device 20 constitutes a display control device 10 together with an image generation device 30. The display control device 10 is a car navigation device, for example. The display control device 10 may include a device etc. other than the movement distance calculation device 20 and the image generation device 30.

The display control device 10 generates an under-floor image 11 obtained by shooting a road surface under the floor of the vehicle 1 and outputs the generated under-floor image 11 to the display device 40. A driver of the vehicle 1 can recognize a state of the road surface under the floor of the vehicle 1 without the need for getting off the vehicle 1 by referring to the under-floor image 11 being displayed on the display device 40. Devices, units, etc. of the vehicle 1 other than those relating to generation of an under-floor image 11 are omitted in FIG. 1.

The movement distance calculation device 20 calculates a first movement distance and a second movement distance. The first movement distance is calculated on the basis of rotation speeds of wheels of the vehicle 1 and a steering angle of the vehicle 1. The second movement distance is calculated on the basis of images taken by cameras installed in the vehicle 1. The movement distance calculation device 20 determines an output movement distance 29 using at least one of the first movement distance and the second movement distance on the basis of the reliability of each of the first movement distance and the second movement distance. The output movement distance 29 is used for generation of an under-floor image 11. The details of the first movement distance and the second movement distance will be described later.

The vehicle 1 is equipped with a vehicle body 1D, a left front wheel 1FL, a right front wheel 1FR, a left rear wheel 1RL, a right rear wheel 1RR, a front shaft 1SF, a rear shaft 1SR, and a power steering device 6.

The left front wheel 1FL is disposed at a front left position of the vehicle body 1D and the right front wheel 1FR is disposed at a front right position of the vehicle body 1D. The left front wheel 1FL and the right front wheel 1FR rotate on the front shaft 1SF (rotary shaft) which is disposed at a front position of the vehicle body 1D. The left front wheel 1FL and the right front wheel 1FR are wheels for steering a course of the vehicle 1. The power steering device 6 assist rotation of a steering shaft 6S on the basis of rotational torque of the steering shaft 6S.

The left rear wheel 1RL is disposed at a rear left position of the vehicle body 1D and the right rear wheel 1RR is disposed at a rear right position of the vehicle body 1D. The left rear wheel 1RL and the right rear wheel 1RR rotate on the rear shaft 1SR (rotary shaft) which is disposed at a rear position of the vehicle body 1D.

The front shaft 1SF transmits output power of an engine (not shown) to the left front wheel 1FL and the right front wheel 1FR. The rear shaft 1SR transmits the output power of the engine the left rear wheel 1RL and the right rear wheel 1RR.

The vehicle 1 is further equipped with a front camera 2F, a left side camera 2L, a right side camera 2R, and a rear camera 2B. The front camera 2F shoots a scene in front of the vehicle 1 and generates a front image 7F. The left side camera 2L shoots a scene on the left of the vehicle 1 and generates a left image 7L. The right side camera 2R shoots a scene on the right of the vehicle 1 and generates a right image 7R. The rear camera 2B shoots a scene in the rear of the vehicle 1 and generates a rear image 7B. The generated images 7F, 7L, 7R, and 7B are output to the display control device 10.

In the embodiment, each of the images 7F, 7L, 7R, and 7B is a frame that is part of a moving image. For example, the front camera 2F outputs a front image 7F (frame) to the display control device 10 every time it generates the front image 7F.

The vehicle 1 is further equipped with vehicle speed sensors 3FL, 3FR, 3RL, and 3RR. The vehicle speed sensor 3FL detects a variation of the rotation angle of the left front wheel 1FL and outputs a pulse signal corresponding to the detected variation of the rotation angle as a signal indicating a rotation speed 8FL of the left front wheel 1FL.

The vehicle speed sensor 3FR outputs a signal indicating a rotation speed 8FR of the right front wheel 1FR. The vehicle speed sensor 3RL outputs a signal indicating a rotation speed 8RL of the left rear wheel 1RL. The vehicle speed sensor 3RR outputs a signal indicating a rotation speed 8RR of the right rear wheel 1RR.

The vehicle 1 is further equipped with a crawl control selection switch 4 and a turn assist selection switch 5, both of which are manipulated by the driver of the vehicle 1.

The crawl control selection switch 4 is used by the driver to command turning-on/off of a crawl control function of the vehicle 1. The crawl control selection switch 4 outputs a crawl control instruction signal 41 indicating turning-on or off of the crawl control function. The details of the crawl control function will be described later.

The turn assist selection switch 5 is used by the driver to command turning-on/off of a turn assist function of the vehicle 1. The turn assist selection switch 5 outputs a turn assist instruction signal 51 indicating turning-on or off of the turn assist function. The details of the turn assist function will be described later.

The vehicle 1 is further equipped with a steering wheel 6W, a steering shaft 6S, and a rotation angle sensor 6A. The steering wheel 6W is manipulated by the driver of the vehicle 1. The steering shaft 6S transmits rotation of the steering wheel 6W to the power steering device 6. The rotation angle sensor 6A detects a rotation angle 6D of the steering shaft 6S and outputs the detected rotation angle 6D to the display control device 10.

The vehicle 1 is further equipped with the display control device 10 and the display device 40. The display control device 10 generates an under-floor image 11 on the basis of images taken by the cameras and outputs the generated under-floor image 11 to the display device 40. The display device 40 displays the under-floor image 11 received from the display control device 10.

[1.2. Definition of World Coordinate System]

Figure 2:
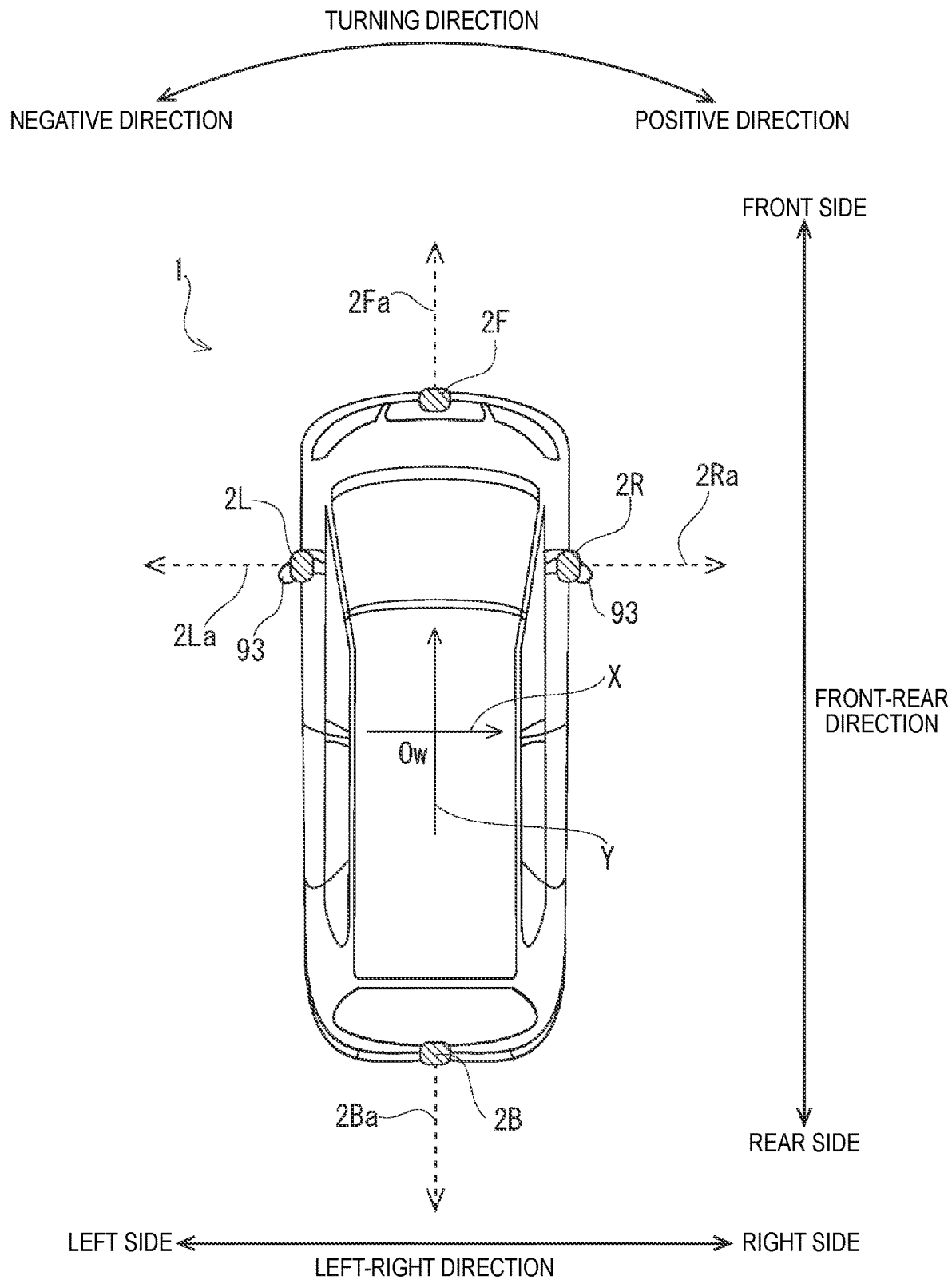
FIG. 2 is a plan view showing an example coordinate system that is defined in the vehicle 1 shown in FIG. 1.

FIG. 2 is a plan view, as viewed from above, of the vehicle 1 shown in FIG. 1 and shows a world coordinate system that is set by the movement distance calculation device 20. Referring to FIG. 2, the origin Ow of the world coordinate system is the center of gravity of the vehicle 1.

The X axis is a straight line extending in the left-right direction of the vehicle 1 which is a direction of a straight line that is perpendicular to both of the front-rear direction of the vehicle 1 and the vertical direction. The Y axis is a straight line extending in the front-rear direction of the vehicle 1. Each of a first movement distance 21a and a second movement distance 23a is represented by a vector in the world coordinate system.

The positive directions of the X axis and the Y axis are determined with reference to an advancement direction of the vehicle 1. The positive direction of the Y axis is the forward direction of the vehicle 1. The positive direction of the X axis is the rightward direction with reference to the forward direction that is the positive direction of the Y axis. A turning direction is a circumferential direction of a circle having the origin Ow as its center, and a turn angle is an angle that is formed by a movement distance (vector) and the unit vector of the Y axis. The positive direction of a turning direction is a clockwise direction with respect to the positive direction of the Y axis.

Next, an arrangement of the cameras installed in the vehicle 1 will be described with reference to FIG. 2. The front camera 2F is installed in the vicinity of a number plate attachment position that is at the front end of the vehicle 1 and its optical axis 2Fa is directed forward of the vehicle 1. The rear camera 2B is installed in the vicinity of a number plate attachment position that is at the front end of the vehicle 1 and its optical axis 2Ba is directed backward of the vehicle 1.

The left side camera 2L is installed on a left door mirror 93 and its optical axis 2La is directed toward the left side of the vehicle 1. The right side camera 2R is installed on a right door mirror 93 and its optical axis 2Ra is directed toward the right side of the vehicle 1.

The lens of each camera installed in the vehicle 1 is a wide-angle lens having an angle of view of 180° or more. The entire surroundings of the vehicle 1 can be shot by using the front camera 2F, the left side camera 2L, the right side camera 2R, and the rear camera 2B. Although it is preferable that the front camera 2F and the rear camera 2B be installed on the center line in the left-right direction of the vehicle 1, they may be installed at positions that are deviated from the center line in the left-right direction.

[1.3. Configuration of Display Control Device 10]

As shown in FIG. 1, the display control device 10 is equipped with the movement distance calculation device 20 and the image generation device 30.

The movement distance calculation device 20 calculates a first movement distance on the basis of rotation speeds 8 and a rotation angle 6D and calculates a second movement distance on the basis of images taken by the cameras installed in the vehicle 1. The movement distance calculation device 20 determines an output movement distance 29 using at least one of the first movement distance and the second movement distance on the basis of the reliability of each of the first movement distance and the second movement distance.

The image generation device 30 receives the output movement distance 29 from the movement distance calculation device 20 and generates an under-floor image 11 on the basis of the received output movement distance 29. The under-floor image 11 is generated on the basis of images taken by the respective cameras.

[1.4. Configuration of Movement Distance Calculation Device 20]

Figure 3:
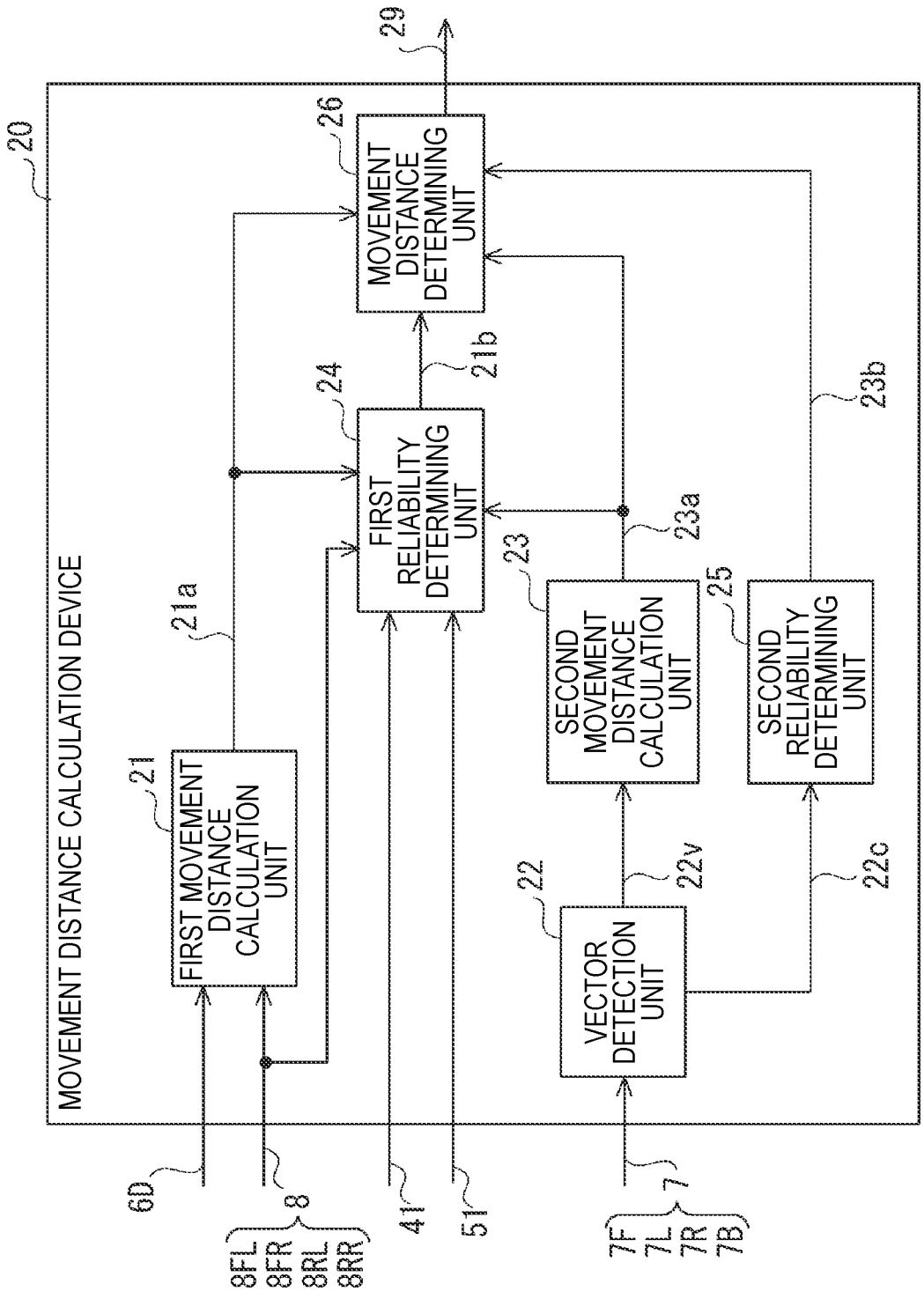
FIG. 3 is a functional block diagram showing the configuration of the movement distance calculation device shown in FIG. 1.

FIG. 3 is a functional block diagram showing the configuration of the movement distance calculation device 20 shown in FIG. 1. As shown in FIG. 3, the movement distance calculation device 20 includes a first movement distance calculation unit 21, a vector detection unit 22, a second movement distance calculation unit 23, a first reliability determining unit 24, a second reliability determining unit 25, and a movement distance determining unit 26.

The first movement distance calculation unit 21 receives a rotation speed 8 from the vehicle speed sensor 3 and receives a rotation angle 6D from the rotation angle sensor 6A. The vehicle speed sensor 3 is a generic term of the vehicle speed sensors 3FL, 3FR, 3RL, and 3RR. The rotation speed 8 is a generic term of vehicle speeds 8FL, 8FR, 8RL, and 8RR.

The first movement distance calculation unit 21 calculates a first movement distance 21a representing a movement distance of the vehicle 1 on the basis of the received rotation speed 8 and rotation angle 6D. The first movement distance 21a is expressed as a vector in the world coordinate system shown in FIG. 2. The first movement distance calculation unit 21 outputs the calculated first movement distance 21a to the first reliability determining unit 24 and the movement distance determining unit 26.

The vector detection unit 22 receives an image 7 from the cameras installed in the vehicle 1. The image 7 is a generic term of a front image 7F, a left image 7L, a right image 7R, and a rear image 7B. The vector detection unit 22 extracts feature points 22c from at least one of the images 7F, 7L, 7R, and 7B and detects movement vectors 22v using the extracted feature points 22c. The vector detection unit 22 outputs the detected movement vectors 22v to the second movement distance calculation unit 23 and outputs the extracted feature points 22c to the second reliability determining unit 25.

The second movement distance calculation unit 23 receives the movement vectors 22v from the vector detection unit 22 and calculates a second movement distance 23a on the basis of the received movement vectors 22v. The second movement distance 23a is expressed as a vector in the world coordinate system. The second movement distance calculation unit 23 outputs the calculated second movement distance 23a to the first reliability determining unit 24 and the movement distance determining unit 26.

The first reliability determining unit 24 determines first reliability 21b. The first reliability 21b indicates reliability of the first movement distance 21a calculated by the first movement distance calculation unit 21 and is a numerical value that is larger than or equal to 0 and smaller than or equal to 100. The first reliability 21b comes closer to 100 as the accuracy of the calculated first movement distance 21a increases. The first reliability 21b comes closer to 0 as the probability increases that the calculated first movement distance 21a cannot be used as a movement distance of the vehicle 1.

More specifically, the first reliability determining unit 24 receives the first movement distance 21a from the first movement distance calculation unit 21 and receives the second movement distance 23a from the second movement distance calculation unit 23. The first reliability determining unit 24 compares the received first movement distance 21a and second movement distance 23a with each other.

The first reliability determining unit 24 receives the rotation speed 8 from the vehicle speed sensor 3. The first reliability determining unit 24 receives a crawl control instruction signal 41 from the crawl control switch 4 and receives a turn assist instruction signal 51 from the turn assist selection switch 5.

The first reliability determining unit 24 determines a variation of the rotation speed of the wheels of the vehicle 1 on the basis of the received rotation speed 8, crawl control instruction signal 41 and turn assist instruction signal 51. The first reliability determining unit 24 determines first reliability 21b on the basis of the determined variation and a result of comparison between the first movement distance 21a and the second movement distance 23a. The first reliability determining unit 24 outputs the determined first reliability 21b to the movement distance determining unit 26.

The second reliability determining unit 25 determines second reliability 23b. The second reliability 23b indicates reliability of the second movement distance 23a calculated by the second movement distance calculation unit 23 and is a numerical value that is larger than or equal to 0 and smaller than or equal to 100. The second reliability 23b comes closer to 100 as the accuracy of the calculated second movement distance 23a increases. The second reliability 23b comes closer to 0 as the probability increases that the second movement distance 23a cannot be used as a movement distance of the vehicle 1.

More specifically, the second reliability determining unit 25 receives feature points 22c from the vector detection unit 22 and determines, on the basis of the received feature points 22c, second reliability 23b of the second movement distance 23a calculated by the second movement distance calculation unit 23. The second reliability determining unit 25 outputs the determined turn assist instruction signal 51 to the movement distance determining unit 26.

The movement distance determining unit 26 receives the first movement distance 21a from the first movement distance calculation unit 21 and receives the first reliability 21b from the first reliability determining unit 24. Furthermore, the movement distance determining unit 26 receives the second movement distance 23a from the second movement distance calculation unit 23 and receives the second reliability 23b from the second reliability determining unit 25. The movement distance determining unit 26 determines an output movement distance 29 using at least one of the first movement distance 21a and the second movement distance 23a on the basis of the received first reliability 21b and second reliability 23b. The movement distance determining unit 26 outputs the determined output movement distance 29 to the image generation device 30.

In the movement distance calculation device 20, the movement distance determining unit 26 determines a movement distance of the vehicle 1 on the basis of the first reliability 21b of the first movement distance 21a determined on the basis of the rotation speed 8 and the rotation angle 6D and the second reliability 23b of the second movement distance 23a determined on the basis of the image 7 taken. The movement distance calculation device 20 can increase the accuracy of a movement distance of the vehicle 1 by using the reliability of each of the first movement distance 21a and the second movement distance 23a.

[2. Operation]

[2.1. Operation of Movement Distance Calculation Device 20]

To describe the operation of the movement distance calculation device 20, time t and time t−1 are defined, which are times when a front image 7F is generated by the front camera 2F. Time t−1 precedes time t and a time length from time t−1 to time t is a frame interval. That is, a front image 7F generated at time t−1 is a frame that immediately precedes a front image 7F generated at time t.

Figure 4:
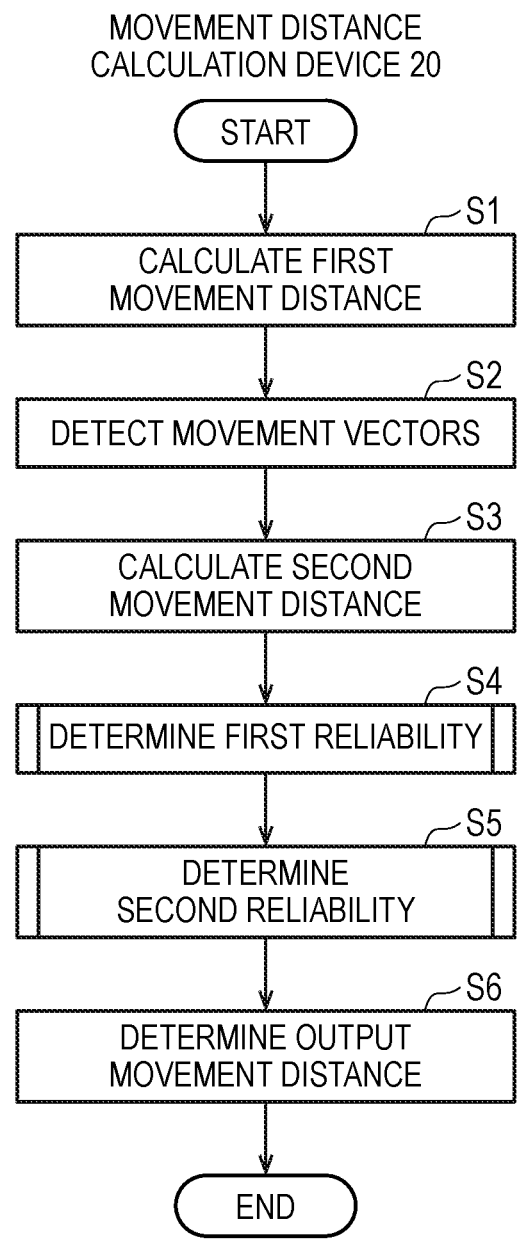
FIG. 4 is a flowchart showing a process that is executed by the movement distance calculation device shown in FIG. 1.

FIG. 4 is a flowchart showing a process that is executed by the movement distance calculation device 20 shown in FIG. 1. The movement distance calculation device 20 executes the process shown in FIG. 4 every time it receives a front image 7F generated by the front camera 2F.

In the following, the process shown in FIG. 4 will be described for a case that the movement distance calculation device 20 has received, from the front camera 2F, a front image 7F that has been generated at time t.

(Calculation of First Movement Distance 21a)

At step S1, the first movement distance calculation unit 21 acquires a rotation speed 8 generated at time t from the vehicle sensor 3 and acquires a rotation angle 6D generated at time t from the rotation angle sensor 6A. The first movement distance calculation unit 21 calculates a first movement distance 21a on the basis of the acquired rotation speed 8 and rotation angle 6D.

Figure 5:
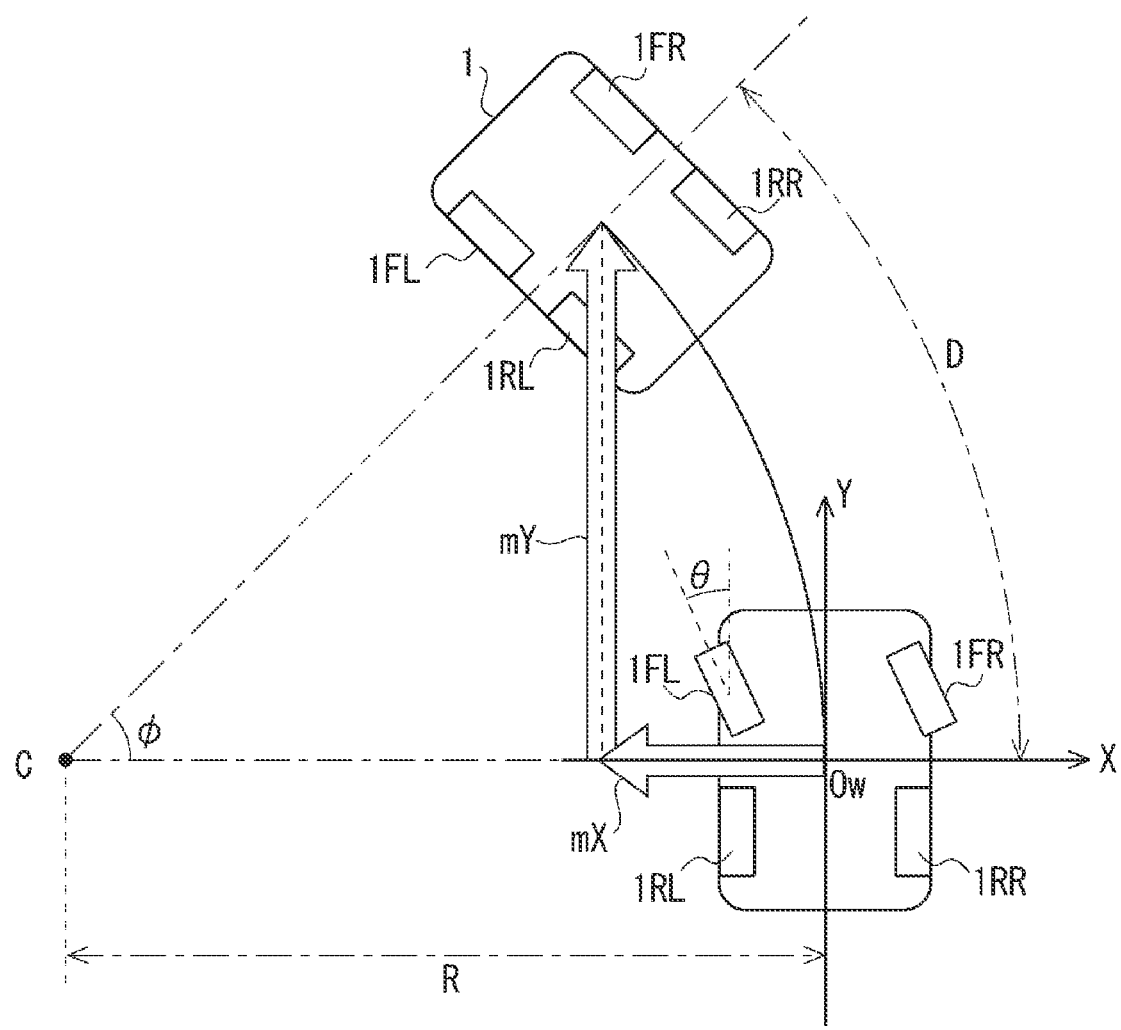
FIG. 5 is a diagram illustrating a procedure according to which a first movement distance calculation unit shown in FIG. 3 calculates a first movement distance.

FIG. 5 is a diagram illustrating how a first movement distance 21a is calculated when the vehicle 1 makes a left turn. An example procedure of calculation of a first movement distance 21a will be described with reference to FIG. 5. The first movement distance calculation unit 21 calculates, as an average rotation speed, the average of rotation speeds 8FL, 8FR, 8RL, and 8RR acquired from the vehicle speed sensor 3. In doing so, the first movement distance calculation unit 21 uses, as each of the rotation speeds 8FL, 8FR, 8RL, and 8RR, an integration value of a pulse signal in a unit time. The first movement distance calculation unit 21 calculates a movement distance D of the vehicle 1 on the basis of the calculated average rotation speed and a preset tire radius.

The first movement distance calculation unit 21 calculates an actual steering angle $\theta$ on the basis of an integration value of the rotation angle 6D. The actual steering angle $\theta$ is an angle formed by the positive direction of the Y axis of the world coordinate system and the wheels for steering a course of the vehicle 1, that is, the front wheels 1FL and 1FR. The first movement distance calculation unit 21 calculates a turn radius R of the vehicle 1 on the basis of the calculated actual steering angle $\theta$ and a preset wheelbase of the vehicle 1. The algorithm for calculation of a turn radius of the vehicle 1 is not limited to the above except that an actual steering angle should be used.

The first movement distance calculation unit 21 determines a rotation angle $\phi$ of the vehicle 1 on the basis of the calculated movement distance D and turn radius R. A rotation angle $\phi$ is calculated according to the following equation:

$$\phi = D/R$$

where D is the movement distance and R is the turn radius.

The first movement distance calculation unit 21 calculates a first movement distance 21a on the basis of the calculated turn radius R and rotation angle $\phi$. An X-axis component mX and a Y-axis component mY of the first movement distance 21a are calculated according to the following equations:

$$mX = -(R - R \cdot \cos \phi)$$

$$mY = R \cdot \sin \phi.$$

The first movement distance 21a at time t is calculated in the above-described manner. The first movement distance calculation unit 21 outputs the calculated first movement distance 21a to the first reliability determining unit 24 and the movement distance determining unit 26.

(Detection of Movement Vectors 22v)

At step S2, the vector detection unit 22 detects movement vectors 22v at time t by comparing a front image 7F generated at time t with a front image 7F generated at time t−1.

The movement vectors 22v, which are optical flow specifically, are each expressed according to sets of pixel coordinates indicating pixel positions of the front image 7F. An algorithm for detection of optical flow is known and hence will not be described in detail. The vector detection unit 22 may detect movement vectors 22v using a particle filter. That is, there no particular limitations on the algorithm for detection of movement vectors 22v.

(Determination of Second Movement Distance 23a)

At step S3, the second movement distance calculation unit 23 receives movement vectors 22v detected at time t from the vector detection unit 22. The second movement distance calculation unit 23 determines a second movement distance 23a on the basis of the received movement vectors 22v.

Figure 6:
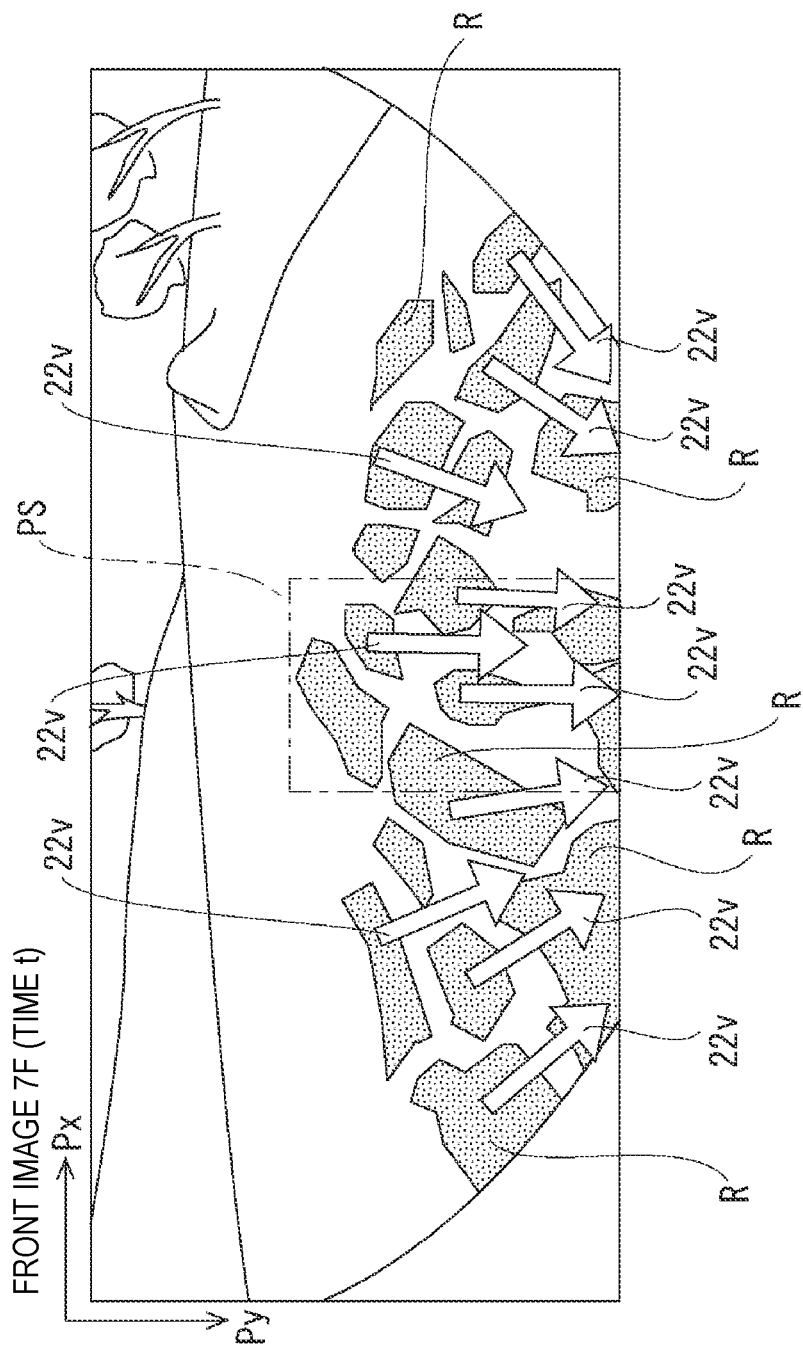
FIG. 6 shows an example front image generated by a front camera shown in FIG. 1.

FIG. 6 shows an example front image 7F generated at time t. More specifically, the front image 7F shown in FIG. 6 is generated by the front camera 2F when the vehicle 1 is running on a craggy place.

As shown in FIG. 6, the front image 7F includes plural rocks R. To make FIG. 6 easier to see, part of the rocks shown are not given the symbol "R." In FIG. 6, the movement vectors 22v are shown so as to correspond to the respective objects (rocks R). In actuality, a movement vector 22v is detected for each of feature points that are detected from the front image 7F. For example, each feature point is an edge that is extracted from the front image 7F.

The second movement distance calculation unit 23 selects, from the movement vectors 22v detected from the front image 7F, ones that are included in a preset region. For example, the preset region is a region PS that is enclosed by a chain line in FIG. 4. The region PS is a narrow region, long in the vertical direction, of the front image 7F. It is desirable that the region PS include part of a line that divides the front image 7F into two equal parts in the left-right direction. This is because where the vehicle 1 is moving forward movement vectors 22v included in the region PS are directed in the vertical direction and hence a second movement distance 23a can be calculated accurately.

The second movement distance calculation unit 23 calculates a movement distance for each selected movement vector 22v. More specifically, the second movement distance calculation unit 23 converts the start point and end point of each movement vector 22v into sets of coordinate values of the world coordinate system shown in FIG. 2. Where the front camera 2F which is fixed to the vehicle 1 shoots a horizontal ground, any position on the horizontal ground correspond to one pixel of the front image 7F. Thus, the second movement distance calculation unit 23 can convert positions of pixels of the front image 7F into sets of coordinates of the world coordinate system.

According to the above theory, the second movement distance calculation unit 23 converts each selected movement vector 22v into a vector in the world coordinate system. The second movement distance calculation unit 23 calculates a movement distance corresponding to each selected movement vector 22v on the basis of the start point and end point of a converted vector in the world coordinate system. The second movement distance calculation unit 23 calculates, as a second movement distance 23a, an average of movement distances calculated for the respective selected movement vectors 22v.

(Determination of First Reliability 21b)

Returning to FIG. 4, at step S4 the first reliability determining unit 24 determines first reliability 21b that indicates reliability of the first movement distance 21a calculated at step S1.

Figure 7:
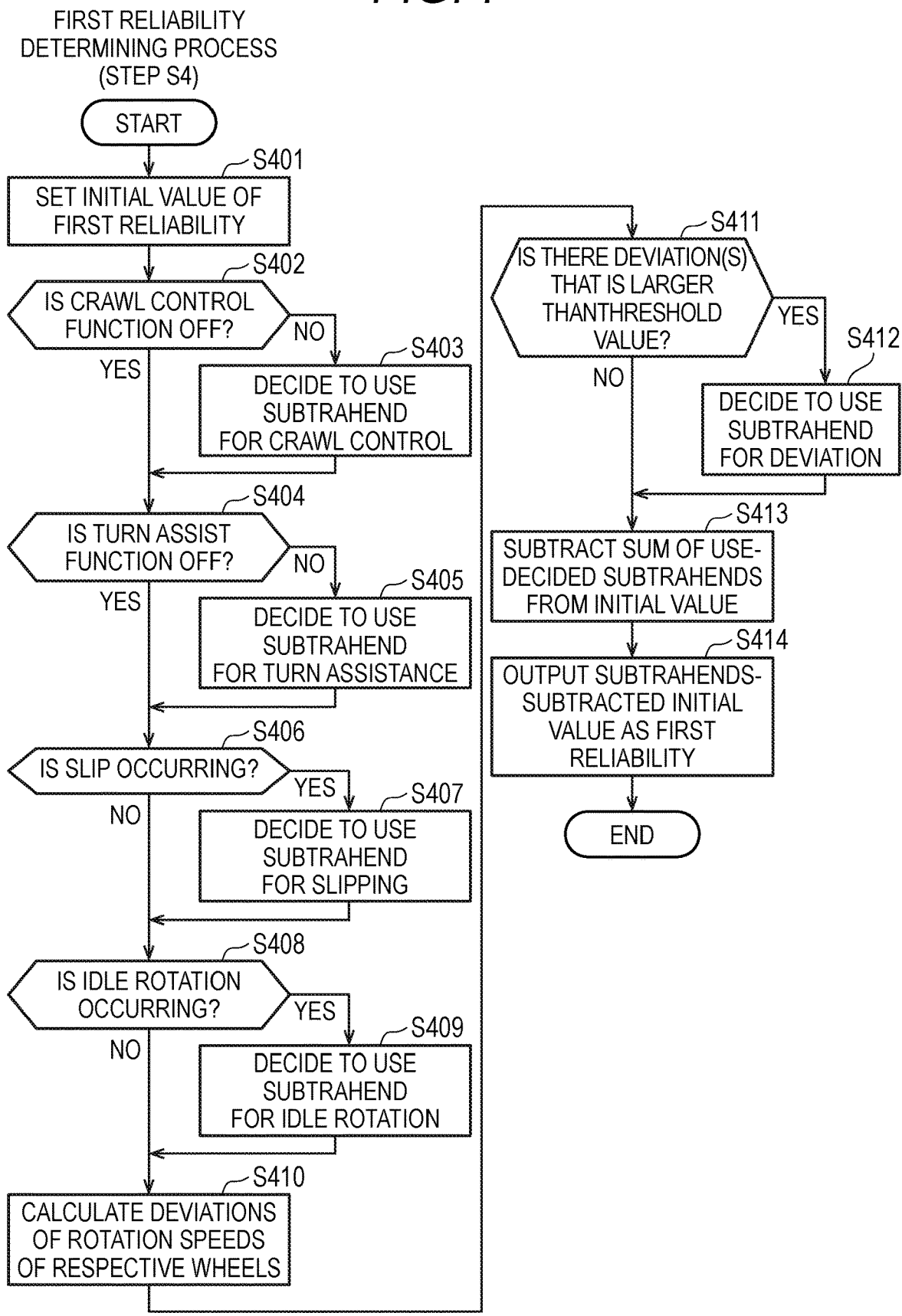
FIG. 7 is a flowchart of a first reliability determining process shown in FIG. 4.

FIG. 7 is a flowchart of the first reliability determining process (step S4) shown in FIG. 4. As shown in FIG. 7, at step S401 the first reliability determining unit 24 sets an initial value of first reliability 21b, which is 100 specifically.

The first reliability determining unit 24 determines whether to use subtrahends to be used for determining first reliability 21b by executing steps S402-S412. The subtrahends are prescribed values to be subtracted from first reliability 21b.

At step S402, the first reliability determining unit 24 acquires a crawl control instruction signal 41 from the crawl control selection switch 41. The first reliability determining unit 24 judges whether the crawl control function is off at time t on the basis of the crawl control instruction signal 41.

If the crawl control function is on (step S402: no), at step S403 the first reliability determining unit 24 decides to use a subtrahend for crawl control. If the crawl control function is off (step S402: yes), the first reliability determining unit 24 moves to step S404. In this case, the subtrahend for crawl control will not be used for the determination of first reliability 21b.

The crawl control, which is also called a very low speed constant speed control, serves to control the brake pressure for each wheel while maintaining the speed of the vehicle 1 at a very low speed. As such, the crawl control can suppress occurrence of a slip, locking, and idle rotation of each tire. When the crawl control function is turned off, the driver of the vehicle 1 need not manipulate the accelerator or brake and can concentrate on manipulation of the steering wheel.

As mentioned above, when the crawl control function is on, the brake pressures are controlled on a wheel-by-wheel basis. It is therefore expected that the rotation speeds of the wheels will not fall within a certain range and will vary to a large extent. When crawl control function is on, the first reliability determining unit 24 judges that the rotation speed 8 has a large variation. When the rotation speed 8 has a large variation, the first movement distance 21a should be low in accuracy. Thus, the first reliability determining unit 24 decides to use the subtrahend for crawl control to make the first reliability 21b come close to 0. As a result, reduction of the accuracy of an output movement distance 29 can be suppressed.

At step S404, the first reliability determining unit 24 acquires a turn assist instruction signal 51 from the turn assist selection switch 5. The first reliability determining unit 24 judges whether the turn assist function is off at time t on the basis of the turn assist instruction signal 51.

The turn assist function controls the rotation of each of the two rear wheels so that the movement distance of the inside rear wheel that is closer to the center of turning becomes smaller than that of the outside rear wheel when the vehicle 1 makes a turn. As a result, the turn radius of the vehicle 1 can be decreased. More specifically, the turn assist function performs control so that the brake pressure for the inside rear wheel becomes higher than that for the outside rear wheel.

If the turn assist function is on (step S404: no), at step S405 the first reliability determining unit 24 decides to use a subtrahend for turn assisting. If the turn assist function is off (step S404: yes), the first reliability determining unit 24 moves to step S406. In this case, the subtrahend for turn assisting will not be used for the determination of first reliability 21b.

When the turn assist function is on, it is expected that the movement distance of the inside rear wheel will become much smaller than that of the outside rear wheel. The rotation speeds of the four wheels of the vehicle 1 will have a large variation and hence the accuracy of the first movement distance 21a will decrease. Thus, the first reliability determining unit 24 decides to use the subtrahend for turn assisting to make the first reliability 21b come close to 0. As a result, reduction of the accuracy of the output movement distance 29 can be suppressed.

At step S406, the first reliability determining unit 24 acquires the first movement distance 21a from the first movement distance calculation unit 21 and acquires the second movement distance 23a from the second movement distance calculation unit 23. The first reliability determining unit 24 compares the acquired first movement distance 21a with the acquired second movement distance 23a and judges whether the vehicle 1 is slipping at time t.

For example, the first reliability determining unit 24 judges that the vehicle 1 is slipping in the front-rear direction if the second movement distance 23a determined on the basis of the front image 7F is longer than the first movement distance 21a determined on the basis of the vehicle speed and the steering angle. The first reliability determining unit 24 judges that the vehicle 1 is slipping in the front-rear direction if the direction of the first movement distance 21a is opposite to that of the second movement distance 23a. The first reliability determining unit 24 judges that the vehicle 1 is slipping in the turning direction if the angle formed by the first movement distance 21a and the second movement distance 23a is larger than a prescribed angle.

If the vehicle 1 is slipping (S406: yes), at step S407 the first reliability determining unit 24 decides to use a subtrahend for slipping. While the vehicle 1 is slipping, the vehicle 1 moves irrespective of the rotation of the wheels. Thus, the first reliability determining unit 24 judges that the accuracy of the first movement distance 21a would be low and decides to use the subtrahend for slipping to make the first reliability 21b come close to 0. As a result, reduction of the accuracy of the output movement distance 29 can be suppressed.

If the vehicle 1 is slipping (S406: no), the first reliability determining unit 24 moves to step S408. In this case, the subtrahend for slipping will not be used for the determination of first reliability 21b.

At step S408, the first reliability determining unit 24 judges whether idle rotation is occurring in the vehicle 1 on the basis of a result of comparison between the first movement distance 21a and the second movement distance 23a that was made at step S406. For example, the first reliability determining unit 24 judges that idle rotation is occurring in the vehicle 1 if the first movement distance 21a is longer than the second movement distance 23a.

If idle rotation is occurring (step S408: yes), at step S409 the first reliability determining unit 24 decides to use a subtrahend for idle rotation. While idle rotation is occurring, the actual movement distance of the vehicle 1 becomes smaller than the first movement distance 21a. Thus, the first reliability determining unit 24 judges that the accuracy of the first movement distance 21a would be low and decides to use the subtrahend for idle rotation to make the first reliability 21b come close to 0. As a result, reduction of the accuracy of the output movement distance 29 can be suppressed.

If no idle rotation is occurring (S408: no), the first reliability determining unit 24 moves to step S410. In this case, the subtrahend for idle rotation will not be for the determination of first reliability 21b.

At step S410, the first reliability determining unit 24 calculates deviations of rotation speeds of the respective wheels. More specifically, the first reliability determining unit 24 calculates, as a deviation of the rotation speed of each wheel, the absolute value of a difference of the rotation speed of the wheel from an average of the rotation speeds 8FL, 8FR, 8RL, and 8RR.

At step S411, the first reliability determining unit 24 judges whether among the deviations calculated at step S410 is a deviation(s) that is larger than a preset threshold value. If a deviation(s) is found that is larger than the threshold value (S411: yes), at step S412 the first reliability determining unit 24 decides to use a subtrahend for deviation. The first reliability determining unit 24 judges that the accuracy of the first movement distance 21a would be low because of a large variation of the rotation speed 8 and decides to use the subtrahend for deviation to make the first reliability 21b come close to 0. As a result, reduction of the accuracy of the output movement distance 29 can be suppressed.

If there is no deviation larger than the threshold value (S411: no), the first reliability determining unit 24 moves to step S413. In this case, the subtrahend for deviation will not be used for the determination of first reliability 21b.

At step S413, the first reliability determining unit 24 subtracts the sum of subtrahends whose use was decided at the steps to step S412 from the initial value of first reliability 21b. For example, if it was decided to use the subtrahend for turn assistance and the subtrahend for slipping, the first reliability determining unit 24 subtracts the sum of the subtrahend for turn assistance and the subtrahend for slipping from the initial value of first reliability 21b.

The subtrahends whose use is to be decided at steps S403, S405, S407, S409, and S412 may have either the same value or different values.

At step S414, the first reliability determining unit 24 outputs a value obtained by subtracting the sum of subtrahends from the initial value to the movement distance determining unit 26 as first reliability 21b.

(Determination of Second Reliability 23b)

As shown in FIG. 3, the second reliability determining unit 25 receives feature points 22c that were used for detecting movement vectors 22v from the vector detection unit 22. As shown in FIG. 4, at step S5, the second reliability determining unit 25 determines second reliability 23b indicating reliability of the second movement distance 23a calculated at time t, using the number of received feature points 22c and a variation of the distribution of the feature points 22c. As a result, the accuracy of an output movement distance 29 can be increased.

Figure 8:
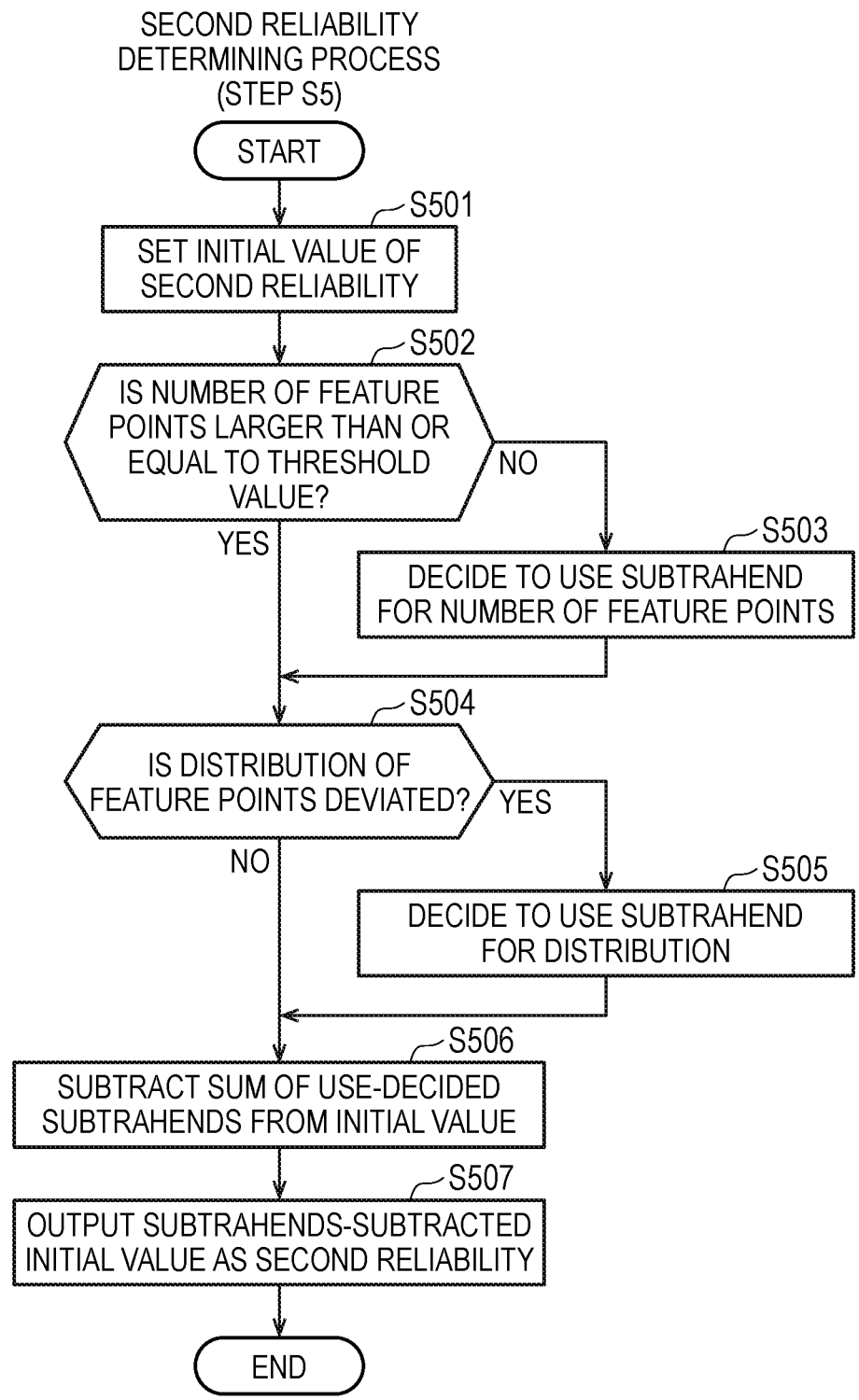
FIG. 8 is a flowchart of a second reliability determining process shown in FIG. 4.

FIG. 8 is a flowchart of the second reliability determining process (step S5) shown in FIG. 4. The second reliability determining process (step S5) will be described in detail for a case of determining second reliability 23b of the second movement distance 23a calculated at time t.

At step S501, the second reliability determining unit 25 sets an initial value of second reliability 23b, which is 100 specifically.

At step S502, the second reliability determining unit 25 compares the number of feature points 22c received from the vector detection unit 22 with a preset reference threshold value. If the number of received feature points 22c is smaller than the reference threshold value (S502: no), the second reliability determining unit 25 judges that the number of movement vectors that are used for calculating the second movement distance 23a is not sufficient and hence the error of the second movement distance 23a would be large. At step S503, the second reliability determining unit 25 decides to use a subtrahend for the number of feature points to make the second reliability 23b come close to 0.

If the number of received feature points 22c is larger than or equal to reference threshold value (S502: yes), the second reliability determining unit 25 moves to step S504. In this case, the subtrahend for the number of feature points will not be used for the determination of second reliability 23b.

At step S504, the second reliability determining unit 25 judges whether the distribution of the received feature points 22c is deviated. For example, the second reliability determining unit 25 divides a road surface shooting area of the front image 7F into plural regions and counts the numbers of feature points in the respective divisional regions. Since the front camera 2F is fixed to the vehicle 1, it is possible to determine, in advance, a road surface shooting area in a front image 7F. The second reliability determining unit 25 judges that the distribution of the feature points 22c is deviated (S504: yes) if the dispersion of the numbers of feature points 22c in the respective divisional regions is larger than a prescribed dispersion threshold value.

If the distribution of the feature points is deviated (S504: yes), at step S505 the second reliability determining unit 25 decides to use the subtrahend for distribution. If the distribution of the feature points is not deviated (S504: no), the second reliability determining unit 25 moves to step S506. In this case, the subtrahend for distribution will not be used for the determination of second reliability 23b.

At step S506, the second reliability determining unit 25 subtracts the sum of subtrahends whose use was decided at the steps to step S412 from the initial value of second reliability 23b determined at step S501. Step S506 will not be described in detail because it is similar to step S413 shown in FIG. 6.

At step S507, the second reliability determining unit 25 outputs a value obtained by subtracting the sum of subtrahends from the initial value at step S506 to the movement distance determining unit 26 as second reliability 23b.

(Determination of Output Movement Distance 29)

The movement distance determining unit 26 receives the first movement distance 21a from the first reliability determining unit 24 and receives the second reliability 23b from the second reliability determining unit 25. As shown in FIG. 4, at step S6, the movement distance determining unit 26 determines an output movement distance 29 on the basis of the received first reliability 21b and second reliability 23b.

FIG. 9 shows an example determination table 28 that is used by the movement distance determining unit 26 to determine an output movement distance 29. The movement distance determining unit 26 selects, as an output movement distance 29, one of the first movement distance 21a and the second movement distance 23a.

A threshold value TH1 is a reference to be used for judging whether the accuracy of the first movement distance 21a is high or low. If the first reliability 21b is higher than or equal to the threshold value TH1, the accuracy of the first movement distance 21a is judged high. If the first reliability 21b is lower than the threshold value TH1, the accuracy of the first movement distance 21a is judged low.

A threshold value TH2 is a reference to be used for judging whether the accuracy of the second movement distance 23a is high or low. If the second reliability 23b is higher than or equal to the threshold value TH2, the accuracy of the second movement distance 23a is judged high. If the second reliability 23b is lower than the threshold value TH2, the accuracy of the second movement distance 23a is judged low. The threshold value TH2 may have a different value than the threshold value TH1.

If the first reliability 21b is higher than or equal to the threshold value TH1 and the second reliability 23b is higher than or equal to the threshold value TH2, the movement distance determining unit 26 decides to output the first movement distance 21a as an output movement distance 29.

If the first reliability 21b is higher than or equal to the threshold value TH1 and the second reliability 23b is lower than the threshold value TH2, the movement distance determining unit 26 selects the first movement distance 21a as an output movement distance 29. This is because the accuracy of the first movement distance 21a is considered higher than that of the second movement distance 23a.

That is, if the first reliability 21b is higher than or equal to the threshold value TH1, the movement distance determining unit 26 selects the first movement distance 21a as an output movement distance 29 irrespective of the second reliability 23b. The reason will be described later.

If the first reliability 21b is lower than the threshold value TH1 and the second reliability 23b is higher than or equal to the threshold value TH2, the movement distance determining unit 26 selects the second movement distance 23a as an output movement distance 29. This is because the accuracy of the second movement distance 23a is considered higher than that of the first movement distance 21a.

If the first reliability 21b is lower than the threshold value TH1 and the second reliability 23b is lower than the threshold value TH2, the movement distance determining unit 26 decides to output the first movement distance 21a as an output movement distance 29. That is, if judging that the accuracy of the first movement distance 21a is approximately the same as that of the second movement distance 23a, the movement distance determining unit 26 uses the first movement distance 21a preferentially over the second movement distance 23a.

The reason why the first movement distance 21a is selected if the first reliability 21b is higher than or equal to the threshold value TH1 will be described below. As described above, when the front camera 2F shoots a horizontal ground, pixels of a front image 7F are correlated with sets of coordinates of the world coordinate system. However, it occurs commonly while the vehicle 1 is running that the front camera 2F cannot take an image of a horizontal ground. For example, such an event occurs when the vehicle 1 is running off-road, such as when the vehicle 1 is running on dirt or a craggy place. In such a case, errors occur commonly in converting pixel positions of a front image 7F into sets of coordinates of the world coordinate system.

On the other hand, when the first reliability 21b is higher than or equal to the threshold value TH1, the rotation speed variation is small. As a result, it is considered that the error of the first movement distance 21a is smaller than the error of the second movement distance 23a even if the first reliability 21b is higher than or equal to the threshold value TH1 and the second reliability 23b is higher than or equal to the threshold value TH2. Based on the above considerations, if the first reliability 21b is higher than or equal to the threshold value TH1, the movement distance determining unit 26 selects the first movement distance 21a irrespective of the second reliability 23b. This makes it possible to further increase the accuracy of determination of a movement distance of the vehicle 1.

Even when the accuracy of the first movement distance 21a and that of the second movement distance 23a are judged approximately the same, the error of the first movement distance 21a is considered smaller than that of the second movement distance 23a. Even when the accuracy of the first movement distance 21a and that of the second movement distance 23a are approximately the same, the movement distance determining unit 26 uses the first movement distance 21a preferentially. This makes it possible to increase the accuracy of determination of a movement distance of the vehicle 1 further.

The table of FIG. 9 does not prohibit the movement distance determining unit 26 from selecting the second movement distance 23a when the accuracy of the first movement distance 21a and that of the second movement distance 23a are judged approximately the same.

When the accuracy of the first movement distance 21a and that of the second movement distance 23a are judged approximately the same, the movement distance determining unit 26 may calculate an output movement distance 29 using both of the first movement distance 21a and the second movement distance 23a. For example, when the first reliability 21b is higher than or equal to the threshold value TH1 and the second reliability 23b is higher than or equal to the threshold value TH2, the average of the first movement distance 21a and the second movement distance 23a may be employed as an output movement distance 29. Alternatively, a weighted average of the first movement distance 21a and the second movement distance 23a may be employed as an output movement distance 29. An output movement distance 29 may be determined in the same manner also in a case that the first reliability 21b is lower than the threshold value TH1 and the second reliability 23b is lower than the threshold value TH2.

[2.2. Operation of Image Generation Device 30]

The image generation device 30 receives the output movement distance 29 from the movement distance determining unit 26 and generates an under-floor image 11 on the basis of the received output movement distance 29. More specifically, the image generation device 30 determines, on the basis of the received output movement distance 29, a shot road region corresponding to a current under-floor road region from images 7 taken in the past. The image generation device 30 extracts an image of the determined region from the images 7 taken and outputs the extracted image to the display device 40 as an under-floor image 11.

The image generation device 30 may generate images of a neighborhood of the vehicle 1 on the basis of images 7 taken and determine a shot road region corresponding to a current under-floor road region on the basis of the generated neighborhood images.

As described above, the movement distance calculation device 20 determines an output movement distance 29 on the basis of first reliability 21b indicating reliability of a first movement distance 21a calculated on the basis of rotation speeds of the wheels and a steering angle and second reliability 23b indicating reliability of a second movement distance 23a calculated on the basis of a front image 7F. Configured in this manner, the movement distance calculation device 20 can increase the accuracy of calculation of a movement distance of the vehicle 1.

Modifications

Although the above embodiment is directed to the case that the first reliability determining unit 24 judges whether to use each of a subtrahend for crawl control, a subtrahend for turn assistance, a subtrahend for slipping, a subtrahend for idle rotation, and a subtrahend for deviation, the invention is not limited to this case. The first reliability determining unit 24 need not always use a subtrahend for slipping and a subtrahend for idle rotation. That is, the first reliability determining unit 24 may judge whether the rotation speeds of the wheels have an excessive variation and determine first reliability 21b according to a result of the judgment.

The first reliability determining unit 24 need not always use a subtrahend for crawl control and a subtrahend for turn assistance. That is, the first reliability determining unit 24 may determine first reliability 21b on the basis of a result of comparison between a first movement distance 21a and a second movement distance 23a.

Although the above embodiment is directed to the case that the second reliability determining unit 25 determines second reliability 23b on the basis of feature points 22c received from the vector detection unit 22, the invention is not limited to this case. The second reliability determining unit 25 may determine second reliability 23b on the basis of a variation of magnitudes or directions of movement vectors 22v. As another alternative, the second reliability determining unit 25 may calculate an average luminance of an image 7 taken and determine second reliability 23b on the basis of the calculated average luminance. In this case, the second reliability determining unit 25 may set a subtrahend if the calculated average luminance is smaller than a preset luminance threshold value. That is, the second reliability determining unit 25 may determine second reliability 23b on the basis of information relating to objects included in an image 7 taken.

Although the above embodiment is directed to the case that the first reliability determining unit 24 judges whether the vehicle 1 is slipping or whether idle rotation is occurring, the invention is not limited to this case. The first reliability determining unit 24 may acquire, from outside the movement distance calculation device 20, a slip signal indicating whether the vehicle 1 is slipping, and may acquire, from outside the movement distance calculation device 20, an idle rotation signal indicating whether idle rotation is occurring.

Although the above embodiment is directed to the case that the second movement distance calculation unit 23 calculates a second movement distance 23a on the basis of a front image 7F, the invention is not limited to this case. The second movement distance calculation unit 23 may calculate a second movement distance 23a on the basis of one of a left side image 7L, a right side image 7R, and a rear image 7B.

As a further alternative, the second movement distance calculation unit 23 may calculate plural second movement distances 23a on the basis of plural respective images taken. In this case, the second reliability determining unit 25 determines second reliability 23b corresponding to each of the plural second movement distances 23a. In determining an output movement distance 29, the movement distance determining unit 26 may use a most reliable second movement distance 23a among the plural second movement distances 23a.

In determining an output movement distance 29, the movement distance determining unit 26 may use two second movement distances 23a corresponding to two highest pieces of second reliability 23b among the plural second movement distances 23a. In this case, the movement distance determining unit 26 uses the average of the two pieces of second reliability 23b corresponding to the two second movement distances 23a. The movement distance determining unit 26 determines an output movement distance 29 on the basis of at least one of a first movement distance 21a and the average of the two second movement distances 23a.

Where the second movement distance calculation unit 23 calculates plural second movement distances 23a, the movement distance determining unit 26 may use all of the second movement distances 23a in determining an output movement distance 29. Where the movement distance determining unit 26 use all the second movement distances 23a, it operates in the same manner as in the above-described case of using two second movement distances 23a.

Although the above embodiment is directed to the case that the output movement distance 29 is used for generation of an under-floor image 11, the invention is not limited to this case. There are no particular limitations on the use of the output movement distance 29. For example, the output movement distance 29 may be used for determining a current position of the vehicle 1.

In the embodiment, each of the functional blocks of the movement distance calculation device 20 may be implemented as a one-chip semiconductor device such as an LSI or all or part of the functional blocks of the movement distance calculation device 20 may be implemented as a one-chip semiconductor device. Although the term "LSI" is used above, it may be referred to as an "IC," "system LSI," "super LSI," or "ultra LSI" depending on its degree of integration.

The manner of implementation of an integrated circuit is not limited to formation of an LSI; an integrated circuit may be implemented as a dedicated circuit or a general-purpose processor. The LSI may be an FPGA (field programmable gate array) in which programming is possible after its manufacture or a reconfigurable processor in which the connections between circuit cells inside the LSI and their settings are reconfigurable.

All or part of the processes executed in the movement distance calculation device 20 may be implemented as programs. All or part of the steps executed by each of the functional blocks employed in the embodiment is executed by a central processing unit (CPU) of a computer. A program for execution of each step is stored in a storage device such as a hard disk drive or a ROM and is run in a state that it is stored in the ROM, for example, or after being read into a RAM.

Each of the processes employed in the embodiment may be implemented by hardware or as software (including a case that it is implemented together with an OS (operating system), middleware, or a prescribed library). Each of the processes employed in the embodiment may be implemented as a mixed process involving both of software and hardware.

Figure 10:
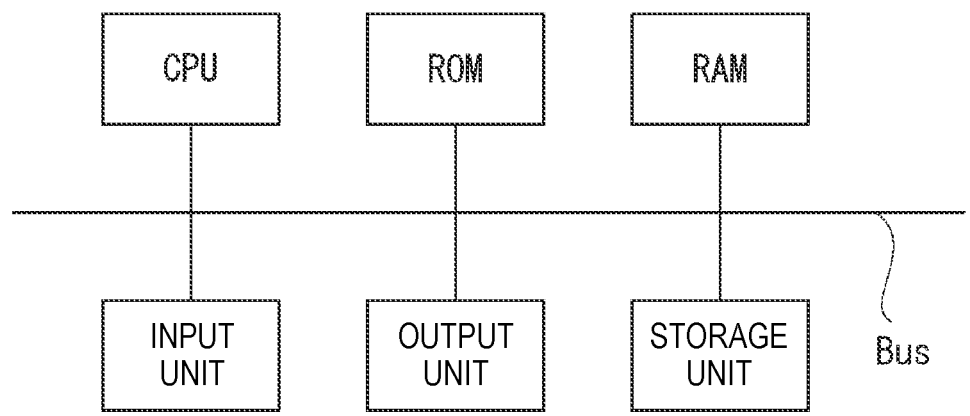
FIG. 10 shows an example hardware configuration of the movement distance calculation device in which a CPU and other units are connected to each other by a bus.

For example, where each of the functional blocks of the movement distance calculation device 20 is implemented as software, each functional block may be implemented by software processing using a hardware configuration shown in FIG. 10 (e.g., a CPU, a ROM, a RAM, an input unit, an output unit, etc. are connected to each other by a bus).

The order of execution of the processes employed in the embodiment is not limited to that employed in the embodiment and may be changed without departing from the spirit and scope of the invention.

The scope of the invention encompasses a computer program for causing a computer to perform the above-described method and a computer-readable recording medium in which the program is recorded. Examples of the computer-readable recording medium are a flexible disk, a hard disk drive, a CD-ROM, an MO, a DVD, a DVD-ROM, a DVD-RAM, a large-capacity DVD, a next-generation DVD, and a semiconductor memory.

Although the embodiment of the invention has been described above, it is just an example of how the invention is practiced. Thus, the invention is not restricted to the above embodiment and can be practiced in such a manner that the embodiment is modified as appropriate without departing from the spirit and scope of the invention.

LIST OF REFERENCE SYMBOLS

1: Vehicle
10: Display control device
20: Movement distance calculation device
40: Display device
21: First movement distance calculation unit
22: Vector detection unit
23: Second movement distance calculation unit
24: First reliability determining unit
25: Second reliability determining unit
26: Movement distance determining unit

What is claimed is:

1. A movement distance calculation device comprising:
a first movement distance calculation unit which calculates a first movement distance of a movable body based on plural rotation speeds of plural wheels of the movable body and a steering angle of the movable body;
a vector detection unit which acquires, at a prescribed time interval, images taken by a camera installed in the movable body and detects a movement vector of an object included in the acquired images;
a second movement distance calculation unit which calculates a second movement distance of the movable body based on the movement vector detected by the vector detection unit;
a first reliability determining unit which determines reliability of the calculated first movement distance based on at least one of a variation of the plural rotation speeds and a result of comparison between the first movement distance calculated by the first movement distance calculation unit and the second movement distance calculated by the second movement distance calculation unit;
a second reliability determining unit which determines reliability of the calculated second movement distance based on information relating to the object included in the acquired images; and
a movement distance determining unit which determines a movement distance using at least one of the calculated first movement distance and the calculated second movement distance based on the reliability of the first movement distance determined by the first reliability determining unit and the reliability of the second movement distance determined by the second reliability determining unit.

2. The movement distance calculation device according to claim 1, wherein in a case wherein the reliability of the first movement distance determined by the first reliability determining unit is higher than a first threshold value, the movement distance determining unit selects the determined first movement distance irrespective of the reliability of the second movement distance determined by the second reliability determining unit.

3. The movement distance calculation device according to claim 1, wherein when the movable body is performing a crawl control, the first reliability determining unit sets the reliability of the first movement distance lower than when the movable body is not performing the crawl control.

4. The movement distance calculation device according to claim 2, wherein when the movable body is performing a crawl control, the first reliability determining unit sets the reliability of the first movement distance lower than when the movable body is not performing the crawl control.

5. The movement distance calculation device according to claim 1, wherein:
the plural wheels comprise a first wheel and a second wheel disposed at a rear position of the movable body; and
when the movable body is performing a turn assist control during a turn of the movable body, the first reliability determining unit sets the reliability of the first movement amount lower than when the movable body is not performing the turn assist control.

6. The movement distance calculation device according to claim 2, wherein:
the plural wheels comprise a first wheel and a second wheel disposed at a rear position of the movable body; and
when the movable body is performing a turn assist control during a turn of the movable body, the first reliability determining unit sets the reliability of the first movement amount lower than when the movable body is not performing the turn assist control.

7. The movement distance calculation device according to claim 3, wherein:
the plural wheels comprise a first wheel and a second wheel disposed at a rear position of the movable body; and
when the movable body is performing a turn assist control during a turn of the movable body, the first reliability determining unit sets the reliability of the first movement amount lower than when the movable body is not performing the turn assist control.

8. The movement distance calculation device according to claim 4, wherein:
the plural wheels comprise a first wheel and a second wheel disposed at a rear position of the movable body; and
when the movable body is performing a turn assist control during a turn of the movable body, the first reliability determining unit sets the reliability of the first movement amount lower than when the movable body is not performing the turn assist control.

9. The movement distance calculation device according to claim 1, wherein when the movable body is slipping, the first reliability determining unit sets the reliability of the first movement distance lower than when the movable body is not slipping.

10. The movement distance calculation device according to claim 2, wherein when the movable body is slipping, the first reliability determining unit sets the reliability of the first movement distance lower than when the movable body is not slipping.

11. The movement distance calculation device according to claim 3, wherein when the movable body is slipping, the first reliability determining unit sets the reliability of the first movement distance lower than when the movable body is not slipping.

12. The movement distance calculation device according to claim 4, wherein when the movable body is slipping, the first reliability determining unit sets the reliability of the first movement distance lower than when the movable body is not slipping.

13. The movement distance calculation device according to claim 1, wherein when idle rotation is occurring in the movable body, the first reliability determining unit sets the reliability of the first movement distance lower than when idle rotation is not occurring in the movable body.

14. The movement distance calculation device according to claim 2, wherein when idle rotation is occurring in the movable body, the first reliability determining unit sets the reliability of the first movement distance lower than when idle rotation is not occurring in the movable body.

15. The movement distance calculation device according to claim 3, wherein when idle rotation is occurring in the movable body, the first reliability determining unit sets the reliability of the first movement distance lower than when idle rotation is not occurring in the movable body.

16. The movement distance calculation device according to claim 4, wherein when idle rotation is occurring in the movable body, the first reliability determining unit sets the reliability of the first movement distance lower than when idle rotation is not occurring in the movable body.

17. The movement distance calculation device according to claim 1, wherein the second reliability determining unit determines reliability of the calculated second movement distance based on at least one of number of feature points of the object included in the acquired images and a variation of a distribution of the feature points.

18. The movement distance calculation device according to claim 2, wherein the second reliability determining unit determines reliability of the calculated second movement distance based on at least one of number of feature points of the object included in the acquired images and a variation of a distribution of the feature points.

19. The movement distance calculation device according to claim 3, wherein the second reliability determining unit determines reliability of the calculated second movement distance based on at least one of number of feature points of the object included in the acquired images and a variation of a distribution of the feature points.

20. A movement distance calculation method comprising:
calculating a first movement distance of a movable body based on plural rotation speeds of plural wheels of the movable body and a steering angle of the movable body;
acquiring, at a prescribed time interval, images taken by a camera installed in the movable body and detecting a movement vector of an object included in the acquired images;
calculating a second movement distance of the movable body based on the detected movement vector;
determining reliability of the calculated first movement distance based on at least one of a variation of the plural rotation speeds and a result of comparison between the calculated first movement distance and the calculated second movement distance;
determining reliability of the calculated second movement distance based on information relating to the object included in the acquired images; and
determining a movement distance using at least one of the calculated first movement distance and the calculated second movement distance based on the determined reliability of the first movement distance and the determined reliability of the second movement distance.

* * * * *